Dec. 22, 1931.  J. BORN  1,837,250

HAIRBRUSH

Filed July 7, 1930

INVENTOR.
JOSEPH BORN.
BY Munn & Co.
ATTORNEYS.

Patented Dec. 22, 1931

1,837,250

UNITED STATES PATENT OFFICE

JOSEPH BORN, OF SAN FRANCISCO, CALIFORNIA, ASSIGNOR OF ONE-HALF TO JOSEPH JOSEPHSON, OF GERLACH, NEVADA

HAIRBRUSH

Application filed July 7, 1930. Serial No. 466,304.

My invention relates to improvements in hair brushes, and it consists in the combinations, constructions and arrangements hereinafter described and claimed.

An object of my invention is to provide an improvement over that form of the device shown in my co-pending application Serial No. 432,845 filed March 3, 1930. In said application I show a power hair brush consisting of an endless belt with bristles, the belt being driven by a source of power such as an electric motor. In the present form of the device I drive the endless belt by means of a flexible shaft which permits the actuating motor to be supported by some other means than by the hand of the operator. This lightens the device.

A further object of my invention is to provide a device of type described which makes use of an elastic belt having inclined edges that act as a protecting cover for the operating parts. This prevents the hair from becoming entangled in the working parts during the operation of the device.

A further object of my invention is to provide a device of the type described which has novel means for taking up slackness in the endless belt and for adjusting the position of the axis of one of the rollers so as to cause the belt to be properly positioned on the rollers.

Other objects and advantages will appear as the specification proceeds, and the novel features of the device will be particularly pointed out in the claims hereto annexed.

My invention is illustrated in the accompanying drawings, in which.

Figure 1:
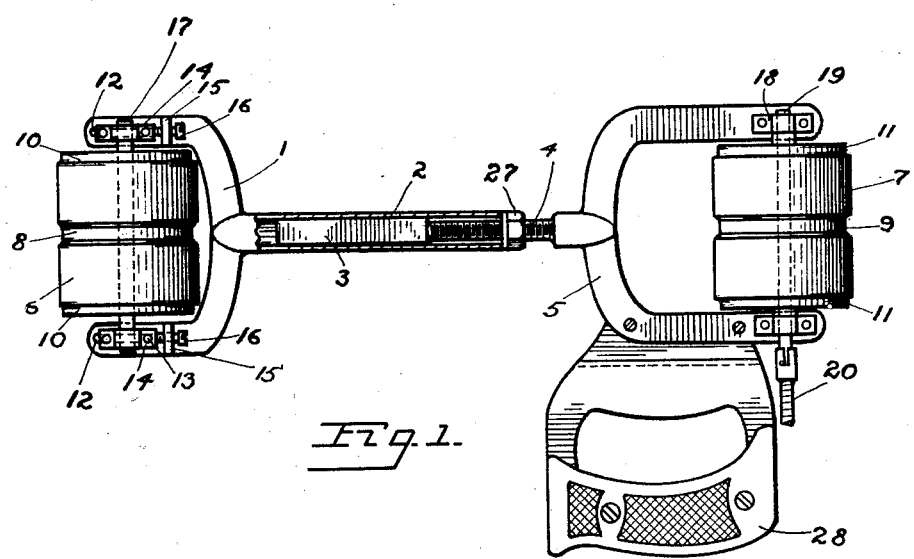
Figure 1 is a top plan view of the device with the endless belt removed.
Figure 4:
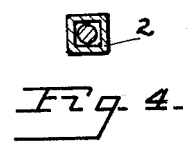
Figure 4 is a section along the line 4—4 of Figure 2.

In carrying out my invention I provide a forked member 1 (see Figure 1) having a hollow sleeve 2 which is preferably non-circular in cross section as shown in Figure 4. Within the sleeve I slidably mount a non-circular member 3 which conforms to the non-circular sleeve 2. The member 3 has a screw shank 4 which carries a forked member 5.

The forked members 1 and 5 rotatably carry rollers 6 and 7. These rollers are provided with annular grooves 8 and 9 respectively that are positioned midway between the ends of the rollers. If desired, annular grooves 10—10 and 11—11 may be provided in the ends of the rollers 6 and 7 respectively. The purpose of the grooves will be hereinafter described.

The forked member 1 has slots 12 therein (see Figure 1) for slidably receiving bolts 13 or other suitable fastening means that secure bearings 14 to the forked member. Lugs 15 are carried by the forked member, and screws 16 are threaded through the lugs and abut against the bearings 14. The bearings carry a shaft 17 which in turn carries the roller 6. The screws 16 permit a fine adjustment of the roller 6 with respect to the forked member 1.

The forked member 5 carries bearings 18 which in turn carry a shaft 19 upon which the roller 7 is mounted. A flexible shaft 20 connects with a source of power such as a motor (not shown), and this shaft is removably secured to the shaft 19. The rotation of the shaft 20 will cause the roller 7 to rotate.

Figure 2:
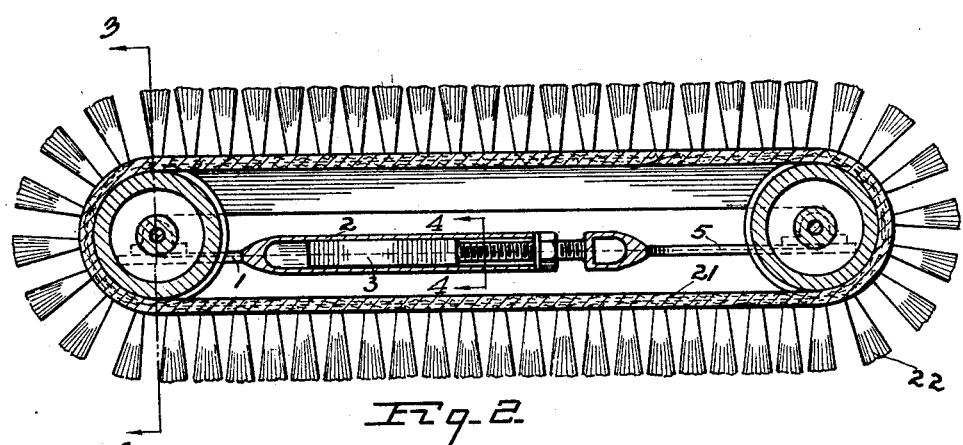
Figure 2 is a longitudinal section through the device showing the belt in place.
Figure 3:
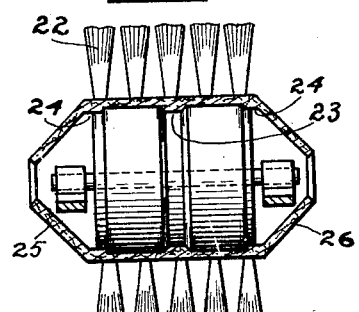
Figure 3 is a section along the line 3—3 of Figure 2.

In Figure 2 I show an endless elastic belt 21 passed around the rollers 6 and 7. This belt carries bristle tufts 22. In Figure 3 I show the belt as being provided with a central rib 23 that enters the grooves 8 and 9. I further show other ribs 24—24 that enter the grooves 10—10 and 11—11 in the rollers 6 and 7. The belt 21 is also provided with inclined edge portions or aprons 25 and 26 that extend toward each other for substantially closing the opening between the two sides of the endless belt. The inclined rubber portions 25 and 26 protect the moving parts and prevent hair from getting entangled with these parts. The elasticity of the belt permits the inclined portions to bend back upon themselves when the middle portion of the belt passes around either one of the rollers 6 and 7 without the belt buckling up at these portions.

From the foregoing description of the various parts of the device, the operation thereof may be readily understood.

An adjusting nut 27 is rotated on the screw shank 4 so as to permit the rollers 6 and 7 to be moved close enough together to permit the belt 21 to be placed upon the rollers. The nut 27 is then rotated for causing the rollers 6 and 7 to engage with the belt in the manner already described. If a fine adjustment is needed, the screws 16 may be regulated.

The device is preferably used in barber shops where it is desired to brush and massage the scalp at the same time. The belt 21 is made removable from the device in order that the bristles may be sterilized each time the device is used. A handle 28 connects with the member 5, and by means of this handle the operator can move the device over the scalp. The device is extremely simple in construction and is durable and efficient for the purpose intended.

Although I have shown and described one embodiment of my invention, it is to be understood that the same is susceptible of various changes, and I reserve the right to employ such changes as may come within the scope of the claims hereto annexed.

I claim:

1. A hair brush comprising a pair of rollers spaced apart, an endless belt disposed on the rollers and carrying bristle tufts, the edges of the belt being inclined for providing aprons which extend toward each other from the opposing sections of the belt and serving as guards over the rollers.

2. A hair brush comprising a frame, means for adjusting the length of the frame, a roller carried by each end of the frame, and an endless bristle-carrying belt disposed around the rollers and enclosing the latter and the frame.

3. A hair brush comprising a pair of rollers arranged in spaced relation, an endless belt disposed on the rollers and carrying bristle tufts, the edges of the belt being inclined for providing aprons which extend toward each other from opposing sections of the belt and serving as guards over the rollers, and reinforcing ribs carried by the belt at the junction of the aprons and the belt sections.

4. A hair brush comprising a frame, rollers carried by the ends of the frame, a belt passed around the rollers and carrying bristle tufts, said belt having inclined edges providing aprons which extend toward each other from opposing sections of the belt and substantially closing the opening between the sides of the belt and serving as guards over the rollers, and a handle secured to the frame and extending between the margins of the aprons.

5. A hair brush comprising a pair of Y-shaped members having the stems thereof arranged in telescoping relation, means for limiting the telescoping movement between the members, a roller carried by the forked end of each member, and an endless brush belt carried by the rollers and enclosing the latter and the frame.

JOSEPH BORN.